United States Patent [19]
Dunagan et al.

[11] Patent Number: 5,341,619
[45] Date of Patent: Aug. 30, 1994

[54] TRUSS GIRDER HANGER CONNECTION

[75] Inventors: Brian D. Dunagan, Gardnerville, Nev.; Alfred D. Commins, Danville, Calif.

[73] Assignee: Simpson Strong-Tie Company, Inc., San Leandro, Calif.

[21] Appl. No.: 46,019

[22] Filed: Apr. 9, 1993

[51] Int. Cl.⁵ .............................................. E04B 1/38
[52] U.S. Cl. ..................................... 52/702; 248/300; 403/232.1
[58] Field of Search ......................... 52/702, 712, 714; 248/300; 403/232.1, 237; 411/461, 462, 463, 464

[56]         References Cited
        U.S. PATENT DOCUMENTS

| | | | |
|---|---|---|---|
| 4,261,155 | 4/1981 | Gilb | 52/702 |
| 4,423,977 | 1/1984 | Gilb | 403/232.1 |
| 4,560,301 | 12/1985 | Gilb | 403/232.1 |
| 4,717,279 | 1/1988 | Commins | 403/232.1 X |
| 4,841,690 | 6/1989 | Commins | 52/712 X |
| 4,890,436 | 1/1990 | Colonias | 52/702 X |

OTHER PUBLICATIONS

Simpson Strong-Tie Co., Inc. catalog p. 5 copyright 1992 THGAR/L Skewed Truss Girder Hanger.
Photograph of Simpson Strong-Tie Company, Inc.
Simpson Strong-Tie Co., Inc. catalog p. 68 copyright 1993 U/HU Sloped and/or Skewed Hangers.

*Primary Examiner*—Carl D. Friedman
*Assistant Examiner*—Kevin D. Wilkens
*Attorney, Agent, or Firm*—James R. Cypher

[57]            ABSTRACT

A truss girder hanger connection including a metal truss girder hanger joining a supporting wood truss girder to a carried wood truss girder.

The metal truss girder hanger is structurally connected only to a supporting wood vertical member of the supporting wood truss girder and not to the supporting wood bottom chord.

The truss girder hanger connection is primarily used where the carried wood truss girder is to be supported in a sloped and/or skewed relationship to the supporting wood truss girder.

The metal truss girder hanger is constructed from a single piece of metal and a single weld connects the edge of an extension member to an elongated back member.

5 Claims, 7 Drawing Sheets

TRUSS GIRDER HANGER CONNECTION

BACKGROUND OF THE INVENTION

Generally, this application relates to truss girder hanger connections in the Plated Truss Industry using large heavy metal connectors to join wood truss members as opposed to "traditional" joist hanger connections in the residential and low story apartment building industry using relatively small light weight sheet metal connectors to join sawn wood boards.

The large heavy metal connectors of the present invention support allowable design floor loads in the range of 2,305 pounds up to 10,000 pounds, whereas "traditional" connectors in the residential industry support allowable design floor loads in the range of 470 pounds 3,510 pounds.

Specifically, this application relates to truss girder hangers in which the seat members for holding the carried truss slope downwardly to about 30° and/or skew left or right from about 45° to about 67½°.

Prior art connectors in the plated truss industry which slope and/or skew are formed from a plurality of metal plate members joined at their edges by two or more welds. This type of fabrication is relatively expensive and the integrity of the welds is expensive to monitor.

Another specific requirement of the present invention is that the attachment of the metal connector be to a vertical supporting member and not to the bottom chord of the supporting truss. Since connection of the metal connectors of the present invention are by machine bolts rather than by nails, such bore holes in the bottom chord of the supporting truss would weaken the bottom chord wood member which is normally in tension.

There are no known prior art connectors which are made from a single piece of metal joined by a single weld which are capable of being constructed to support a carried member at a downward sloped angle or which can support a carried member at a downward sloped and skewed angle.

SUMMARY OF THE PRESENT INVENTION

The present invention is for a connection in the plated girder construction industry which includes a metal connector constructed from a single metal member and a single weld which is capable of being constructed to support a carried member at a downward sloped and/or skewed angle.

A primary feature of the present invention is that the sheet metal connector may be constructed from a single piece of metal using only a single weld.

Another feature of the present invention is that the load imposed by the carried member is supported along the center line of the connector member attached to the supporting girder thereby avoiding an eccentric loading on the vertical member of the supporting girder.

Still another feature is the use of a connector that is not attached to the bottom chord of the supporting girder.

DESCRIPTION OF THE PREFERRED EMBODIMENTS OF THE INVENTION

The truss girder hanger connection 1 of the present invention comprises: (a) a carried wood truss girder 2 having an end 3 formed by the intersection of a carried wood bottom chord 4 formed with generally planar first and second sides 5 and 6 and a carried wood compression member 7 formed with generally planar sides 8 and 9; (b) a supporting wood truss girder 10 having a supporting wood bottom chord 11 and a supporting wood vertical member 12 connected to the supporting wood bottom chord 11 having a front generally planar face 13 and formed with a plurality of bolt openings 14 therethrough; (c) a metal truss girder hanger 15 constructed from a single member by bending along substantially straight bend lines, wherein the metal truss girder hanger 15 comprises: (1) an elongated back member 16 having an upper portion 17 having first and second upper edges 18 and 19 and formed with bolt openings 20 for registration with the plurality of bolt openings 14 in the front generally planar face 13 of the supporting wood vertical member 12, the elongated back member 16 having a mid portion 21 having a first intermediate inset edge 22 terminating at a lower end point 23 inwardly of the first upper edge 18, and the elongated back member 16 including a lower portion 24; (2) a first side member 25 joined to the lower portion 24 of the elongated back member 16 along a first bend line 26 terminating at its upper end 27 adjacent the lower end point 23 of the first intermediate inset edge 22 of the mid portion 21 of the elongated back member 16 formed and dimensioned for registration with the first generally planar side 5 of the carried wood truss girder 2; (3) a seat member 28 joined to the first side member 25 along a second bend line 29 formed and dimensioned for receiving the end 3 of the carried wood truss girder 2; (4) a second side member 30 spaced from and in parallel relation to the first side member 25 and joined to the seat member 28 along a third bend line 31, formed and dimensioned for registration with the second generally planar side 6 of the carried wood truss girder 2; (5) an extension member 32 joined to the second side member 30 along a fourth bend line 33 and having an edge 34 formed and dimensioned for connection to the lower and mid portions 24 and 21 of the elongated back member 16 by a weld 35 so that the carried wood truss girder 2 is angularly skewed at a selected angle 36 relative to the supporting wood truss girder 10; (d) bolt fasteners 37 inserted through the bolt openings 20 in the upper portion 17 of the elongated back member 16 of the metal truss girder hanger 15 and into the supporting wood vertical member 12; and (e) fasteners 38 inserted through the second side member 30 of the metal truss girder hanger 15 and into the carried wood truss girder 2.

The first form of the invention described above and illustrated in FIGS. 1 through 7 discloses a sloped and skewed truss girder hanger connection 1. The second form of the invention is illustrated in FIGS. 8 through 14 and teaches a skewed truss girder hanger connection 1' in which the carried wood truss girder 2' is held at an angle of 90° to the plane of the elongated back member 16' of metal truss girder hanger 15'. Elements in FIGS. 8 through 14 which are similar or identical to elements illustrated in FIGS. 1 through 8 are indicated by (') primes. The description of FIGS. 8–14 is not repeated, except where necessary to clarify and distinguish the second from the first form of the invention.

Figures 1, 2:
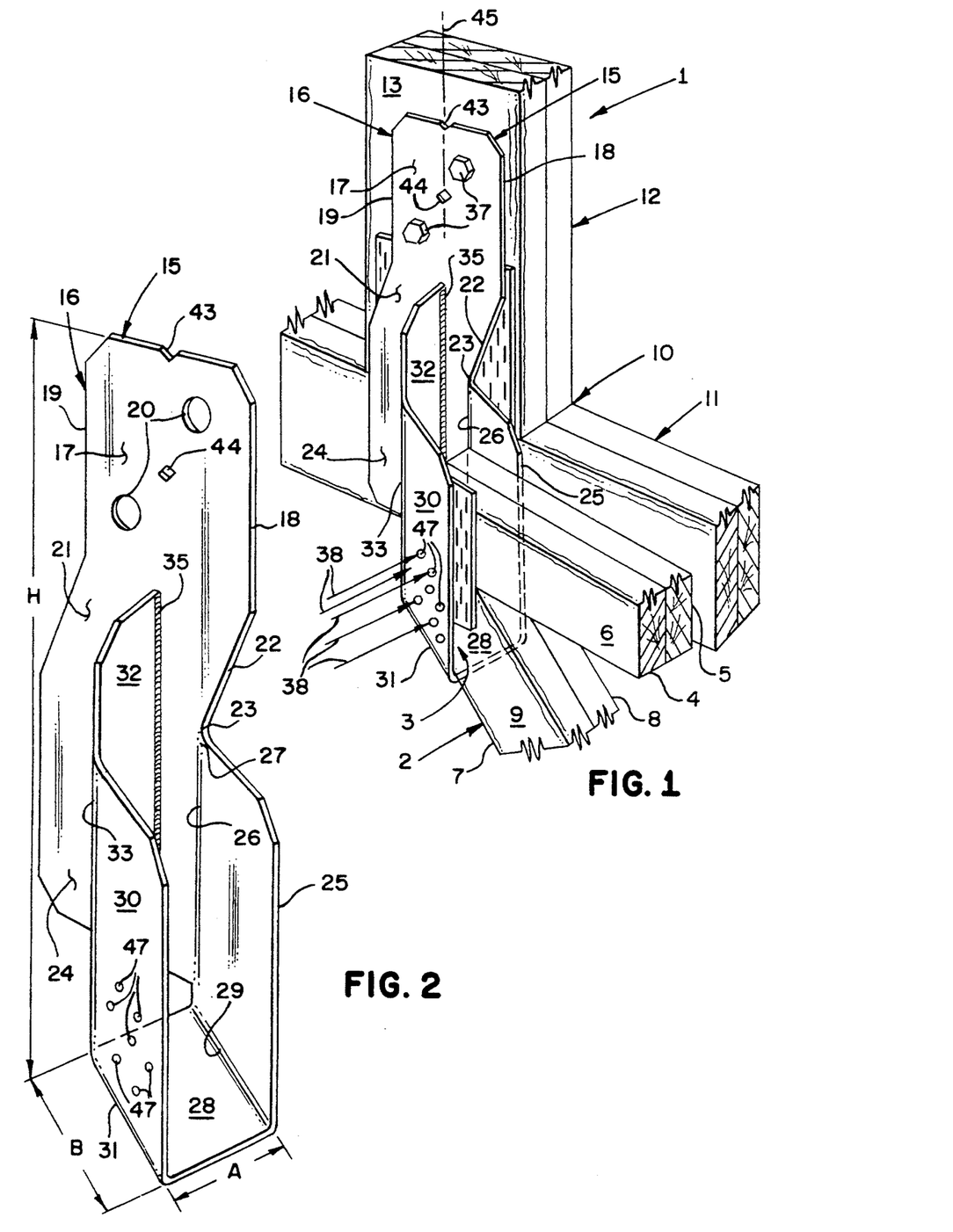
FIG. 1 is a perspective view of one form of the sloped and skewed truss girder hanger connection of the present invention.
FIG. 2 is a perspective view of the truss girder hanger illustrated in FIG. 1.
Figure 3:
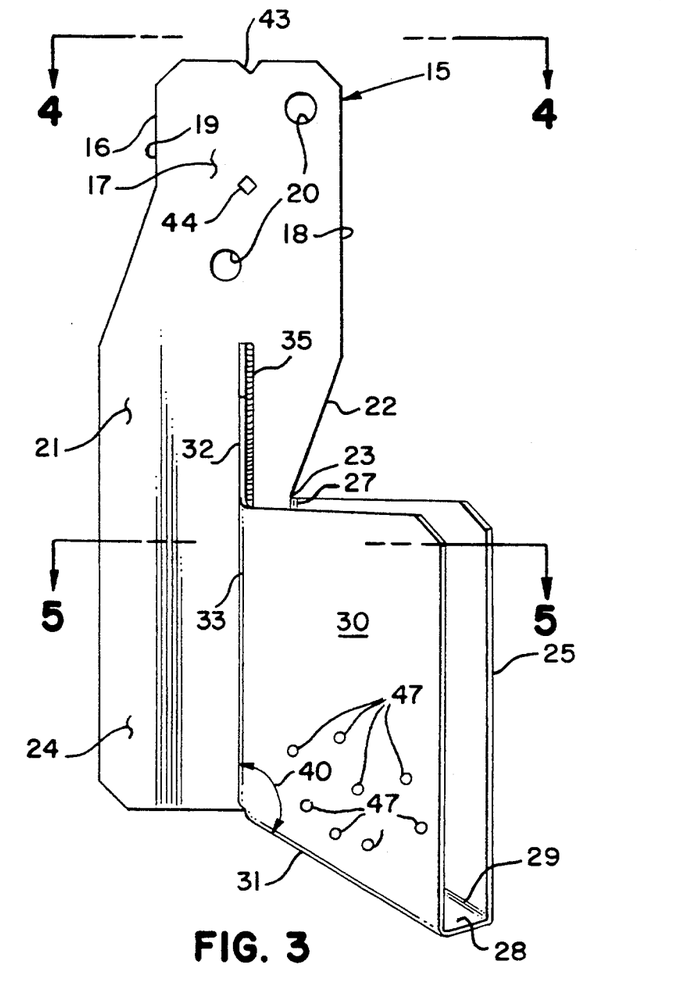
FIG. 3 is a front elevation view of the truss girder hanger illustrated in FIGS. 1 and 2.
Figure 10:
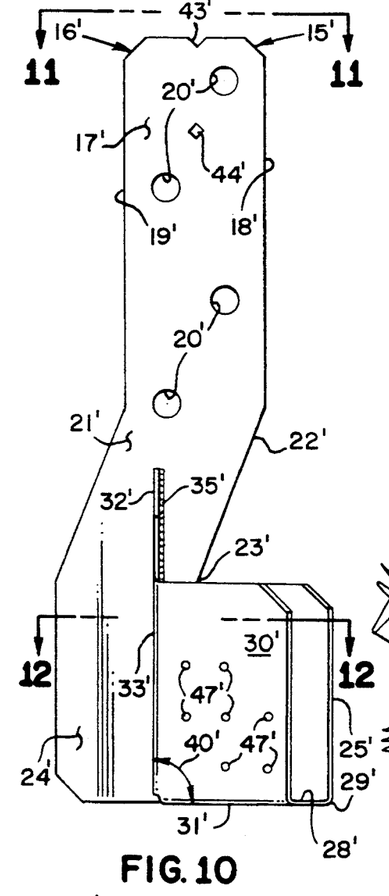
FIG. 10 is a front elevation view of the truss girder hanger illustrated in FIGS. 8 and 9.
Figure 14:
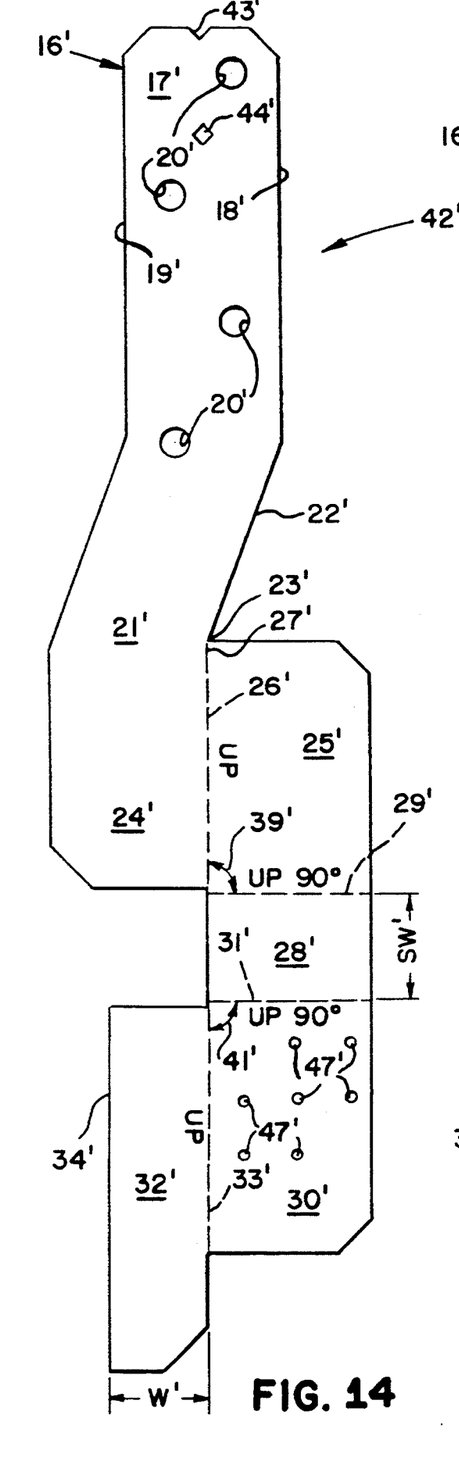
FIG. 14 is a top plan view of the blank member used in forming the truss girder hanger illustrated in FIGS. 8-13.

As may be seen from the drawings, particularly FIGS. 10 and 14, if seat 28' is to be held at an angle 40' of 90° to the plane of the elongated back member 16' of metal truss girder hanger 15', second bend line 29' must intersect the first bend line 26' at a 90° angle 39'. In like manner, angle 41' which is the angle between third bend line 31' and fourth bend line 33' must also be 90°. By increasing angles 39' and 41' from 90° to the obtuse angles 39 and 41 illustrated in FIG. 7, the slope of seat 28' is increased from generally flat to a slope of about 30° as illustrated by seat 28 in FIG. 7. As illustrated in FIG. 3, a downward slope of seat 28 of 30° is the equivalent of an angle 40 of 120° with plane of the elongated back member 16. Thus it may be seen that by varying angles 39 and 41, an infinite number of downward slopes may be imparted to seat 28. As a commercial matter, a downward slope of about 30° is a maximum. It is to be understood that if a greater slope is required for a special case, the angles 39 and 41 need only be increased.

Figure 4:
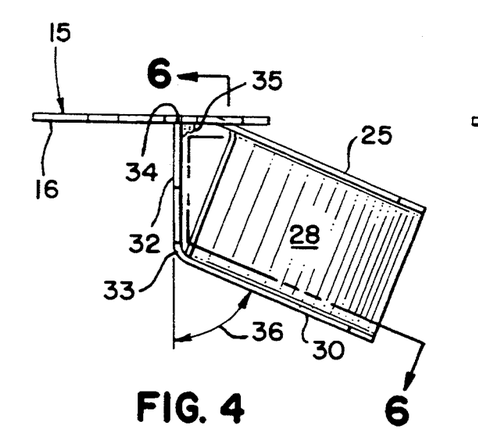
FIG. 4 is a top plan view of the truss girder hanger illustrated and taken along line 4—4 in FIG. 3.
Figure 11:
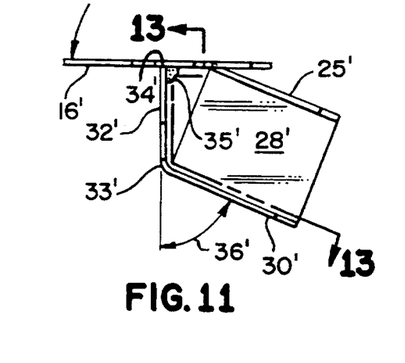
FIG. 11 is a top plan view of the truss girder hanger illustrated and taken along line 11—11 in FIG. 10.
Figure 12:
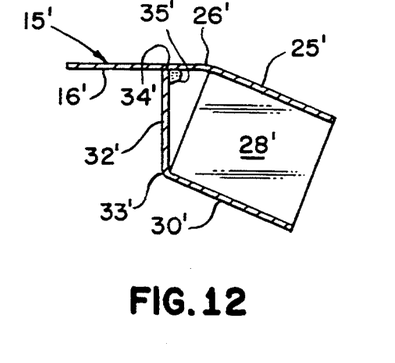
FIG. 12 is a cross sectional view of the truss girder hanger illustrated and taken along line 12—12 in FIG. 10.
Figure 13:
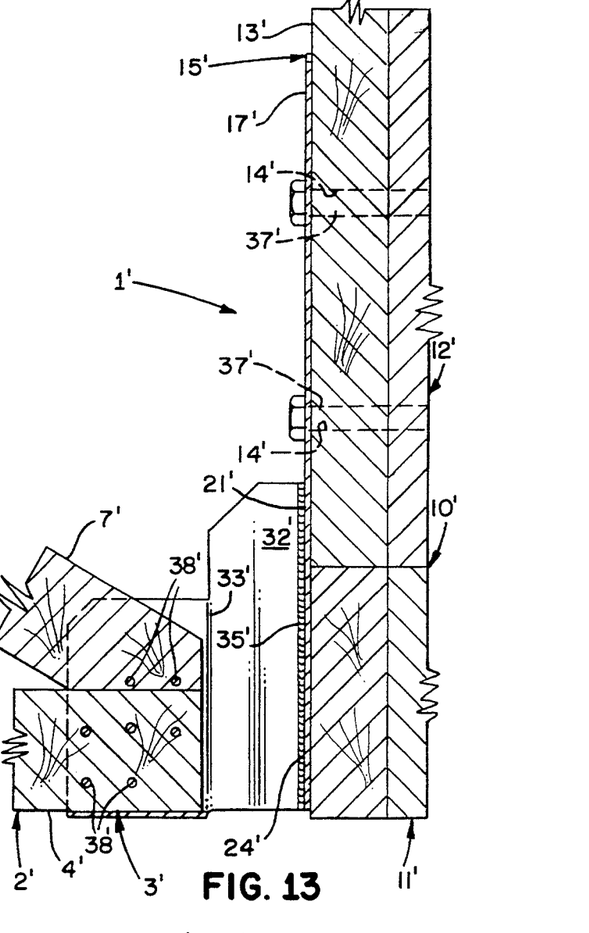
FIG. 13 is a cross sectional view of the truss girder hanger illustrated and taken along line 13—13 in FIG. 11 with cross sectional portions of the wood girder members illustrated in FIG. 8 for purposes of illustration.

The amount of skew between the supporting wood truss girder 10 and the carried wood truss girder 2 may vary at an infinite angle between 0° and 90°. As a practical commercial matter, the skew angle 36 as illustrated in FIGS. 4 and 11 varies between about 45° and about 67.5°.

The amount of skew is governed by the width "W" of extension member 32. Thus, if the width "W" of extension member 32 was essentially zero inches, there would be no skew angle and the carried wood truss girder 2 would extend at a right angle to the plane of the supporting wood truss girder 10. As the width "W" of extension member 32 increases, the skew increases until the carried wood truss girder 2 and the supporting wood truss girder 10 are essentially parallel. As a commercial matter, the most common skew angles 36, as stated above are between 45° and 67½°. It is desirable that extension member 32 be positioned at right angles to elongated back member 16.

Figure 15:
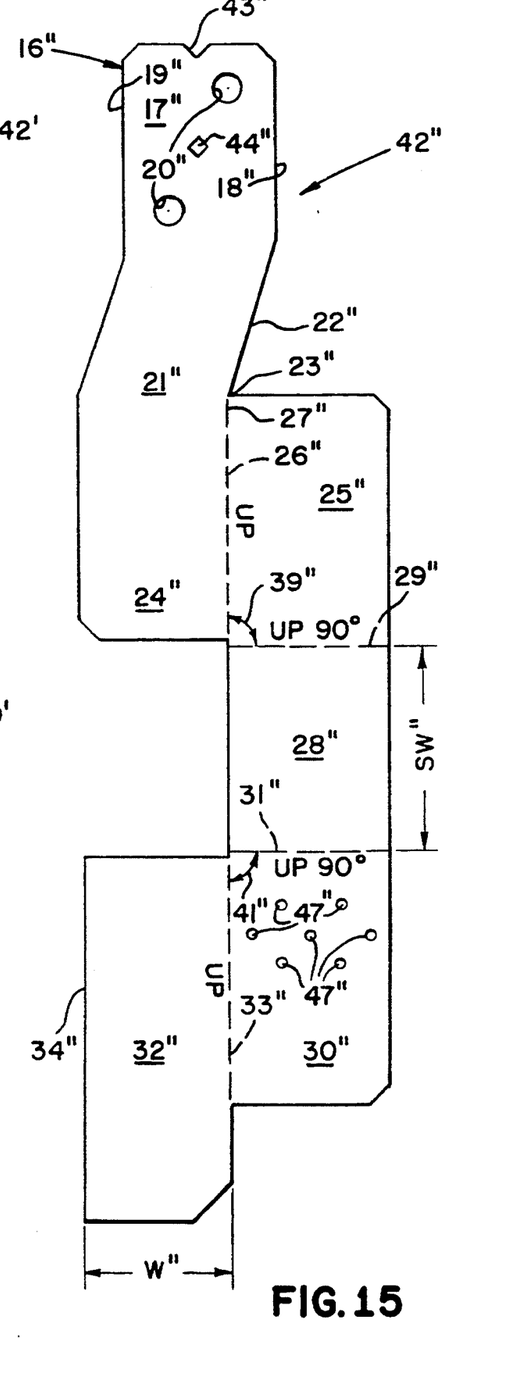
FIG. 15 is a top plan view of a slightly modified blank member used in forming a truss girder hanger similar to those illustrated in FIGS. 8-13, but with a greater skew angle and seat width.

Still another form of the invention is illustrated in FIG. 15. The form of the invention illustrated in FIG. 15 is similar or identical to the forms of the invention illustrated in FIGS. 1 through 14 and is illustrated to show that the seat width SW may infinitely vary to accommodate different widths of carried wood truss girders. Only a blank 42" is illustrated as it is obvious from the previous FIGS. 1 through 15 how the metal truss girder hanger may be constructed. Like or identical parts are identified by double prime numbers (") and no further description of FIG. 15 is deemed necessary.

Figure 7:
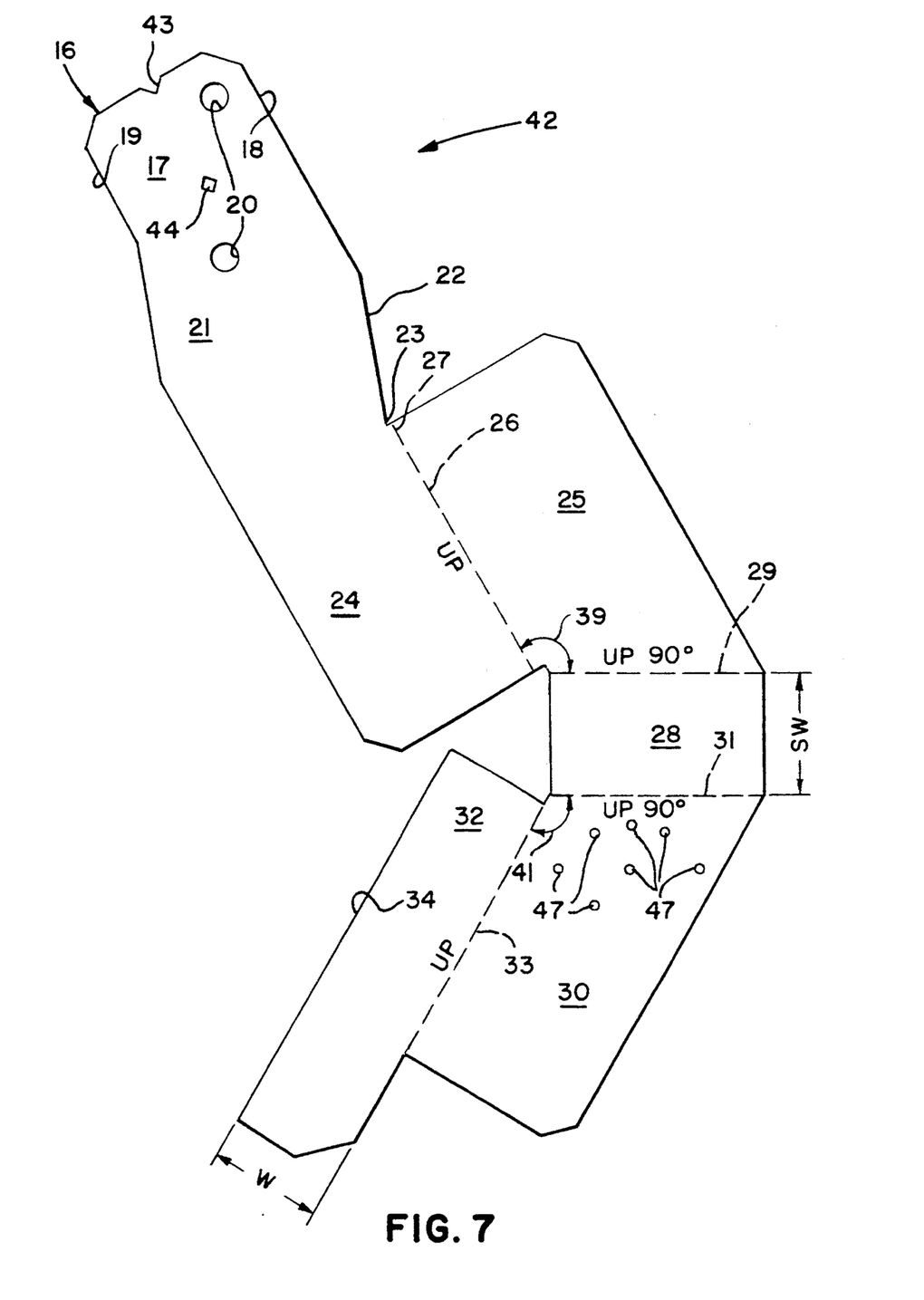
FIG. 7 is a top plan view of the blank used in forming the truss girder hanger illustrated in all of the previous FIGS.
Figures 8, 9:
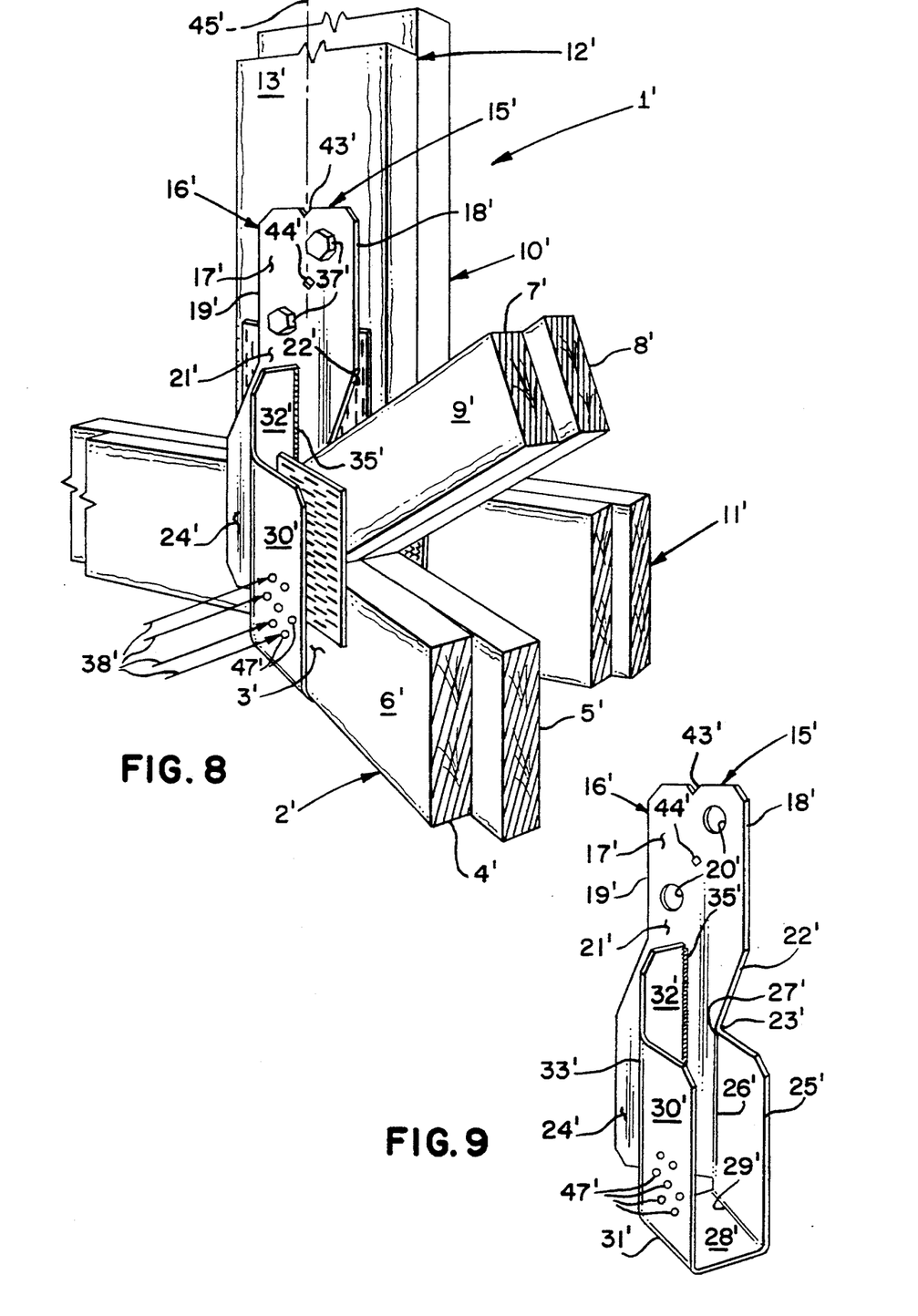
FIG. 8 is a perspective view of another form of the skewed truss girder hanger connection of the present invention.
FIG. 9 is a perspective view of the truss girder hanger illustrated in FIG. 8.

Fabrication of the metal truss girder hanger 15 as illustrated by the blank 42 in FIG. 7 and the metal truss girder hangers 15' and 15" illustrated by the blanks 42' and 42" in FIGS. 14 and 15 respectively are similar and set forth below.

The blank 42 is stamped from a sheet of metal in the form illustrated or in the form described above to obtain varying skew and seat slopes. The customer indicates the angles required and the correct dimensions are determined by preset instructions to a computer which is linked to a plotter which draws the blank 42. After the blank 42 has been cut, the piece is fed to a bending apparatus where first side member 25 is bent up at a preselected angle along first bend line 26. Next, seat 28 is formed by bending upwardly 90° along second bend line 29 and up 90° along third bend line 31. Finally, extension member 32 is bent up a preselected angle along fourth bend line 33.

Figure 5:
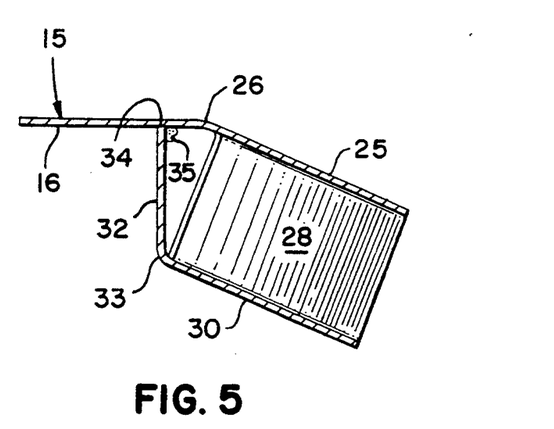
FIG. 5 is a cross sectional view of the truss girder hanger illustrated and taken along line 5—5 in FIG. 3.
Figure 6:
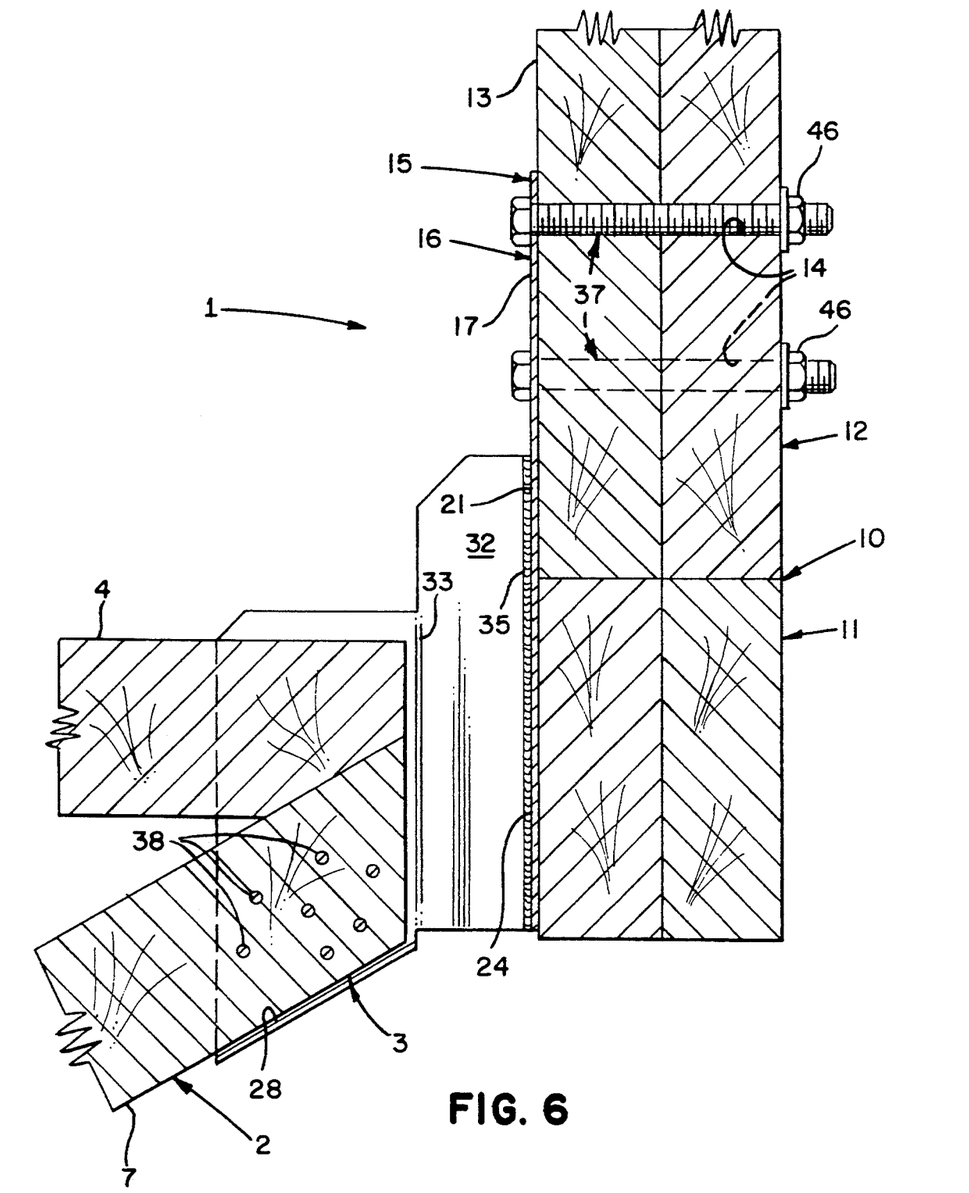
FIG. 6 is a cross sectional view of the truss girder connection illustrated and taken along line 6—6 in FIG. 4 with portions of the cross sections of the wood girder members illustrated in FIG. 1 shown for purposes of illustration.

The final step in assembly is the making of the single weld 35. As illustrated in FIGS. 4 and 5, extension member 32 is positioned at a 90° angle to elongated back member 16. As illustrated in FIG. 3, extension member 32 is in alignment with the center line of elongated back member 16 which is marked as a "V" notch 43 and which serves as a centering guide to the installers. Note that installation diamond 44 also is on the center line of the elongated back member 16 and serves to permit the installer to tack the metal truss girder hanger 15 to the center line 45 of the supporting wood vertical member 12.

Installation of the truss girder hanger connection 1 and 1' is virtually identical, and only the installation of the truss girder hanger connection 1 illustrated in FIGS. 1 through 7 is set forth below. After the supporting wood truss girder 10 has been assembled, and before or after the supporting wood truss girder 10 has been erected, the metal truss girder hanger 15 is spotted in place by nailing through installation diamond opening 44 along center line 45 of supporting wood truss girder 10. Threaded bolt fasteners 37 or other fasteners are then inserted through bored or pre-bored bolt openings 14 in supporting wood vertical member 12. Bolt Fasteners 37 are then placed through the bolt openings and threaded nuts 46 threaded onto the threaded bolt fasteners 37. Carried wood truss girder 2 is then placed on seat member 28 and fasteners 38 are then inserted through pre-punched fastener openings 47 in second side member 30.

The metal truss girder hanger 15 of the present invention is available commercially in three models with the following metal thicknesses: (1) THG2A—12 gauge; (2) THG3A—10 gauge, and (3) THG4A—10 gauge.

The minimum sizes for the supporting wood vertical member 12 are 2×6 for the THG2A and THG3A models; and 2×8 for the THG4A model.

The maximum size carried wood bottom chord 4 is a 2×8 to allow for the minimum bolt end distance required by the building codes.

A minimum of four 10d nails must be inserted into the carried wood turss girder 2. Additional nails increase uplift capacity by 158 lbs per nail for Douglas Fir, Larch and Southern Pine; 128 lbs for Spruce-Pine-Fir.

All three models are available sloped down to 30° and or skewed left or right from 45° to 67 ½°.

Dimensions of the three commercially available metal truss girder hangers 15 is as follows: (Refer to FIG. 2)
THG2A—A—3 7/16"; H—18 ¾"; B—4 ⅜"
THG3A—A—5 ⅛"; H—21 15/16": B—4 ½"
THG4A—A—6 ⅞"; H—27 ¾"; B—5 ¼"

Some representative allowable load values in pounds for the three commercially available models when using Douglas Fir-Larch & Southern Pine, and bolts 6" into the supporting wood truss girder 10 are as follows:

| THG2A floor: | 4,645 | roof (snow): | 5,345 | (wind): | 6,000 |
| THG3A floor: | 6,620 | roof (snow): | 7,615 | (wind): | 8,810 |
| THG4A floor: | 10,000 | roof (snow): | 10,000 | (wind): | 10,000 |

We claim:

1. A skewed truss girder hanger connection comprising:
   a. a generally planar carried wood truss girder having an end formed by the intersection of a carried wood bottom chord formed with generally planar first and second sides and a carried wood compression member formed with generally planar sides;
   b. a generally planar supporting wood truss girder having a supporting wood bottom chord and a supporting wood vertical member connected to said supporting wood bottom chord having a front generally planar face and formed with a plurality of bolt openings therethrough wherein said carried wood truss girder intersects said plane of said supporting wood truss girder at a selected first skew angle;
   c. a metal truss girder hanger constructed from a single sheet of material by bending along substantially straight bend lines, said metal truss girder hanger including:
      1) an elongated back member having an upper portion having a center line and first and second upper side edges generally spaced laterally equidistant from said center line and including upper and lower ends and formed with bolt openings for registration with said plurality of bolt openings in said front generally planar face of said supporting wood vertical member, said elongated back member having an offset mid portion offset at an angle to said upper portion of said elongated back member having first and second intermediate inset edges having upper end points respectively intersecting said lower ends of said first and second, upper side edges and said first intermediate inset edge terminating at a lower end point inwardly of said first upper side edge, and said elongated back member including a lower portion offset from said upper portion of said elongated back member;
      2) a first side member joined to said lower portion of said elongated back member along a first bend line positioned between said center line of said upper portion of said elongated back member and inset from said first upper side edge and terminating at its upper end closely adjacent said lower end point of said first intermediate inset edge of said mid portion of said elongated back member formed and dimensioned for registration with said first generally planar side of said carried wood truss girder;
      3) a seat member joined to said first side member along a second bend line formed and dimensioned for receiving said end of said carried wood truss girder;
      4) a second side member spaced from and in parallel relation to said first side member and joined to said seat member along a third bend line, formed and dimensioned for registration with said second generally planar side of said carried wood truss girder;
      5) an extension member joined to said second side member along a fourth bend line and having an edge formed and dimensioned for connection to said lower and mid portions of said elongated back member at a location between said center line of said upper portion of said elongated back member and said second upper side edge of said elongated back member by a weld so that said carried wood truss girder is angularly skewed at a selected angle relative to said supporting wood truss girder so that the load imposed on said carried wood truss girder is transferred to said supporting wood truss girder along a line closely adjacent the center line of said upper portion of said elongated back member of said metal truss girder hanger;
   d. bolt fasteners inserted through said bolt openings in said upper portion of said elongated back member of said metal truss girder hanger and into said supporting wood vertical member; and
   e. fasteners inserted through said first and second side members of said metal truss girder hanger and into said carried wood truss girder.

2. A truss girder hanger connection as described in claim 1 comprising:
   a. said second bend line intersects said first bend line at a 90° angle so that said seat member is positioned at a generally 90° angle to said elongated back member.

3. A truss girder hanger connection as described in claim 1 comprising:
   a. said second bend line intersects said first bend line at an angle greater than 90° so that said seat member is positioned at an angle with respect to said back member greater than 90° and up to about 120°.

4. A truss girder hanger connection as described in claim 1 comprising:
   a. said extension member has a selected width so that said carried wood truss girder is angularly skewed relative to said supporting wood truss girder at an angle between about 0° and 90°.

5. A truss girder hanger connection as described in claim 4 comprising:

a. said second bend line intersects said first bend line at an angle greater than 90° so that said seat member is positioned at an angle with respect to said back member greater than 90° and up to 180°.

* * * * *